US012695000B1

(12) United States Patent
Null

(10) Patent No.: US 12,695,000 B1
(45) Date of Patent: Jul. 28, 2026

(54) METHOD AND SYSTEM FOR GENERATING OR MANIPULATING STRUCTURED VACUUM ENERGY FIELDS

(71) Applicant: Sean Null, Kansas City, MO (US)

(72) Inventor: Sean Null, Kansas City, MO (US)

( * ) Notice: Subject to any disclaimer, the term of this patent is extended or adjusted under 35 U.S.C. 154(b) by 0 days.

(21) Appl. No.: 19/204,177

(22) Filed: May 9, 2025

(51) Int. Cl.
*G21K 1/00* (2026.01)
*H01Q 15/00* (2006.01)

(52) U.S. Cl.
CPC ............... *G21K 1/00* (2013.01); *H01Q 15/00* (2013.01)

(58) Field of Classification Search
CPC ................................. G21K 1/00; H01Q 15/00
USPC ....................................................... 250/505.1
See application file for complete search history.

(56) References Cited

U.S. PATENT DOCUMENTS 7,456,778 B2 11/2008 Werner
7,702,085 B2 4/2010 Zumkeller
8,886,497 B1 * 11/2014 Vold ........................ G06F 17/13 703/2
9,143,039 B2 9/2015 Yang
10,552,756 B2 2/2020 Ipek
10,970,441 B1 4/2021 Zhang
11,170,318 B2 11/2021 Ashrati
11,209,886 B2 12/2021 Hovis
11,328,206 B2 5/2022 Chai
11,531,385 B2 12/2022 Kim
11,723,277 B2 8/2023 Sadr
11,822,163 B2 11/2023 Leipold
11,901,957 B2 2/2024 Henningsen
12,033,030 B2 7/2024 Killoran
12,033,031 B2 7/2024 Chaplin
2017/0281102 A1 10/2017 Ken
2020/0106445 A1 4/2020 Kerman
2021/0110260 A1 4/2021 Yoshiyama
2021/0132969 A1 5/2021 Smith
2022/0020913 A1 1/2022 Harris et al.
2023/0266308 A1 8/2023 Kauffman
(Continued)

FOREIGN PATENT DOCUMENTS

EP 3642959 B1 4/2020
GB 2034944 A 6/1980

OTHER PUBLICATIONS

Anirudh Hundhi, Hendrik Ulbricht, Measuring Decoherence Due to Vacuum Fluctuations, Thesis Publication, 1-6, University of Trieste, University of Southampton, Italy and United Kingdom, (Jan. 31, 2025).

(Continued)

*Primary Examiner* — Jason L Mccormack
(74) *Attorney, Agent, or Firm* — Losey PLLC

(57) ABSTRACT

A method and system for modulating a vacuum energy field involves identifying a vacuum energy field containing vacuum energy within a defined boundary and utilizing a vacuum modulation engine to determine a scalar field based on the vacuum energy field. The vacuum modulation engine calculates a d'Alembertian operation of the scalar field and a scalar potential of the scalar field, ensuring the d'Alembertian operation equals the scalar potential. Based on these calculations, a modulation field is determined in a format suitable for application by a modulation device. The modulation device then applies the modulation field to the vacuum energy field, structuring the vacuum energy field and generating a modulated vacuum energy output.

9 Claims, 7 Drawing Sheets

(56) References Cited

U.S. PATENT DOCUMENTS

| | | | |
|---|---|---|---|
| 2023/0316117 A1 | 10/2023 | Martinis et al. |
| 2024/0036089 A1 | 2/2024 | Li et al. |
| 2025/0005412 A1 | 1/2025 | Kim et al. |
| 2025/0356235 A1 | 11/2025 | Hoskinson |

OTHER PUBLICATIONS

Joan Sola Peracaula, Cristian Moreno-Pulido, Vacuum Energy and Cosmological Constatn in QFT in Curved Spacetime, Thesis Publication, Institute of Cosmos Sciences University of Barcelona, Spain, (Nov. 12, 2024).
Molecular Physics Review, Simple Quantum Systems: Particle in a Box and Harmonic Oscillator, Website Study Guide, Fiveable, United States, (2025).
Big Think, 3 Independent Proofs that Quantum Fields Carry Energy, Website Article, Big Think, United Staes, (Feb. 16, 2023).
NASA Breakthrough Propulsion Physics Project (2003). Review of Zero-Point Energy Concepts for Space Propulsion.
Casimir, H. B. G. (1948). On the attraction between two perfectly conducting plates. Proceedings of the Koninklijke Nederlandse Akademie van Wetenschappen, 51, 793-795.
Dirac, P. A. M. (1930). The quantum theory of the electron. Proceedings of the Royal Society A: Mathematical, Physical and Engineering Sciences, 126(801), 360-365.
Defense Intelligence Agency (DIA). Quantum Vacuum Energy: Extraction and Applications. Defense Technical Information Center (DTIC), 2009.
Puthoff, H. E. (1993). Electromagnetic Zero-Point Energy: A Physical Perspective. Physical Review A, 47(5), 3454-3462.
Haisch, B., Rueda, A., & Puthoff, H. E. (1994). Inertia as a Zero-Point Field Lorentz Force. Physical Review A, 49(2), 678-694.
Hestenes, D. (1990). The Zitterbewegung Interpretation of Quantum Mechanics. Foundations of Physics, 20(10), 1213-1232.
Beck, C. & Mackey, M. C. (2005). Could Dark Energy be Measured in the Laboratory? Physical Review Letters, 94(9), 091101.
Wu, W. & Yu, F. (2021) Ricci Curvature-Based Semi-Supervised Learning on an Attributed Network. Entropy, 23, 292.
Morel, C. & Morel J. (2025) Impact of Chaos Anticontrol and Switching Frequency on MOSFET Junction Temperature and Lifetime. MDPI Preprints, doi: 10.20944/preprints202501.1749.v1.

* cited by examiner

METHOD AND SYSTEM FOR GENERATING OR MANIPULATING STRUCTURED VACUUM ENERGY FIELDS

TECHNICAL FIELD

The field of the disclosure relates generally to systems and methods for modulating vacuum energy fields, more particularly, to systems and methods for generating and manipulating structured vacuum energy fields using a vacuum modulation engine.

BACKGROUND

Previous approaches to the modulation of vacuum energy fields have primarily focused on theoretical frameworks and experimental setups aimed at understanding the fundamental properties of vacuum fluctuations and their interactions with matter. These experimental efforts have involved the use of high-energy particle accelerators and sophisticated energy field theories to explore the potential for manipulating vacuum states. Researchers have attempted to harness the Casimir effect and other phenomena to influence vacuum energy, but practical applications have remained largely elusive due to the complexity and scale of the required experimental apparatus. In addition, the theoretical frameworks focused on the vacuum energy as stochastic fluctuations in theorized fields and struggled understand how to harness the randomized energy.

In addition to theoretical explorations, some experimental approaches have sought to utilize electromagnetic fields to interact with vacuum states. Techniques have been employed to study the interaction between light and matter such as atoms other particles in a reflective cavity. However, these methods have typically been limited to small-scale systems and have not yet demonstrated the ability to produce significant or scalable modulation effects that could be applied to modify the properties of larger systems or elements.

Furthermore, advancements in nanotechnology and materials science have led to the development of materials and devices designed to interact with vacuum energy fields. These include metamaterials and other engineered structures that can potentially influence vacuum energy through their unique electromagnetic properties. While these materials offer promising avenues for research, they have yet to provide a comprehensive method for the systematic modulation of vacuum energy fields.

BRIEF DESCRIPTION

In some aspects, a method for modulation of a vacuum energy field includes identifying a vacuum energy field that includes vacuum energy within a boundary; determining, using a vacuum modulation engine, a scalar field based on the vacuum energy field; calculating, using the vacuum modulation engine, a d'Alembertian operation of the scalar field; calculating, using the vacuum modulation engine, a scalar potential of the scalar field; determining, based on the scalar field and the scalar potential of the scalar field, a modulation field in a format that is configured to be applied by a modulation device; and applying, using the modulation device, the modulation field to the vacuum energy field to structure the vacuum energy field and generate a modulated vacuum energy output.

In some aspects, a system for modulation of vacuum energy fields includes a vacuum modulation engine configured to: identify a vacuum energy field that includes vacuum energy within a boundary; determine a scalar field based on the vacuum energy field; calculate a d'Alembertian operation of the scalar field; and calculate a scalar potential of the scalar field. The d'Alembertian operation of the scalar field is equal to the scalar potential of the scalar field. The system also includes a modulation device connected to the vacuum modulation engine and configured to apply a modulation field determined based on the scalar field and the scalar potential of the scalar field to the vacuum energy field to structure the vacuum energy field and generate a modulated vacuum energy output.

In some aspects, at least one non-transitory computer-readable media having computer-executable instructions executable by a structured vacuum energy system including a vacuum modulation engine connected to a modulation device and having at least one processor in communication with at least one memory device. The computer-executable instructions cause the at least one processor to identify a vacuum energy field including vacuum energy within a boundary; determine a scalar field based on the vacuum energy field; calculate a d'Alembertian operation of the scalar field; calculate a scalar potential of the scalar field; determine a modulation field determined based on the scalar field and the scalar potential of the scalar field and in a format that is configured to be applied by a modulation device; and cause the modulation device to apply the modulation field to the vacuum energy field to structure the vacuum energy field and generate a modulated vacuum energy output.

Figure 1:
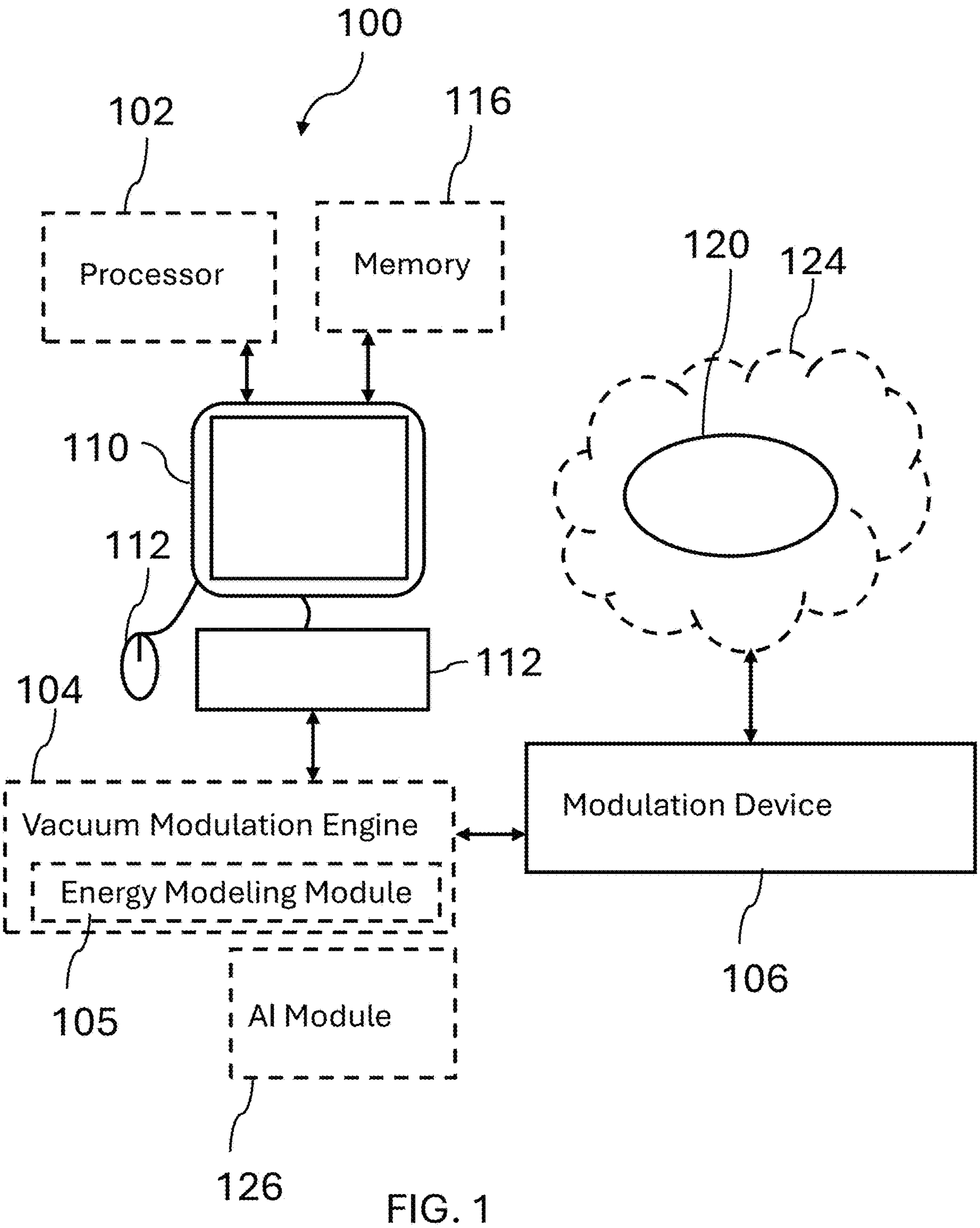
FIG. 1 is a partially schematic diagram of an example computing system including a vacuum modulation engine.

The figures depict embodiments for purposes of illustration only. One skilled in the art will readily recognize from the following discussion that other embodiments of the systems and methods illustrated herein may be employed without departing from the scope of the disclosure.

DETAILED DESCRIPTION

In an example, a system includes a vacuum modulation engine that actively regulates vacuum energy fields in real time and implements physics models (e.g., models of electromagnetic field behavior, including minute background fluctuations) to generate modulations within the vacuum energy fields and thereby structure the vacuum energy fields. The system also utilizes a generalized deterministic field-based modulation method for structuring vacuum energy.

Vacuum energy is traditionally modeled as arising from stochastic fluctuations in theorized fields. The stochastic modeling limits control over coherence, energy stability, and entropy. In contrast to these traditional models, the vacuum modulation engine introduces a deterministic framework for structured vacuum energy which is governed by a modulation mechanism that imposes non-random structure on the vacuum. The vacuum modulation engine establishes the foundation for treating vacuum space not as a stochastic medium, but as a programmable structure. The vacuum modulation engine enables control over energy density in any physical or informational system through the application of deterministic vacuum modulation.

The structured vacuum energy model replaces the stochastic zero-point interpretation of vacuum fluctuations with a deterministic modulation field that provides a tunable structure. For example, the modulation field is used to generate structured fields and facilitate programmable control over vacuum energy density, entropy regulation, and/or system coherence. In examples, the modulation mechanism may be scalar, vector, tensor, topological, logical, symbolic, or computational in nature. As a result, the system is symbolic-agnostic, domain-independent, and invariant to representational transformation, thereby extending across mathematical, physical, computational, and logical implementations. The structured vacuum energy model utilizes a structured vacuum energy function that defines a deterministic energy framework applicable to systems interacting with any vacuum topology or logic.

Example applications of the vacuum modulation engine include employing a deterministic modulation of vacuum behavior to influence energy density, entropy regulation, symbolic stability, logical propagation, physical structure, or information coherence. The vacuum modulation engine encompasses the use of deterministic modulation fields to control and structure vacuum energy in any domain, whether physical, mathematical, symbolic, computational, or otherwise representational.

In an example, the vacuum modulation engine generates a structured vacuum energy through the application of a deterministic modulation field that is calculated and tuned precisely for the energy field to be modulated. In some examples, the modulation field is presented as an isomorphic transformation, substitution schema, or encoded isomorphism and/or has a symbolic or mathematical reformulation. The modulation field imposes non-stochastic modulation of vacuum behavior in the energy field.

The vacuum modulation engine or described principles apply to any systems that rely on deterministic structuring of vacuum energy—regardless of symbolic or mathematical representation—or any other suitable systems. Examples incorporate human-operated, artificial, algorithmic, and/or hybrid systems that generate or operate using structured vacuum modulation logic.

One example includes a computational simulation platform that deterministically modulates vacuum energy fields across symbolic or logical registers to generate coherent output states.

Another example includes an antenna device that applies topological modulation via the modulation field to increase or suppress vacuum-mode coupling.

Another example includes manipulating entropy-controlled logic gate to generate deterministic vacuum fluctuations for energy-efficient state transitions.

Another example includes a data encoding mechanism that uses structured vacuum interactions for symbolic information propagation in non-classical channels.

The systems and engines have implementation across many fields and domains and improve performance of any system. For example, the vacuum modulation engine is implemented in non-physical domains, multi-domain coherence systems, frequency-layered structured vacuum energy architectures, cross-system derivative protocols, virtual vacuum substrates, and/or zero-interface embodiments.

In some examples, the vacuum modulation engine, using AI-driven algorithms (including predictive and generative models), dynamically tunes execution parameters of a computing system to generate structured patterns in the energy fields. For example, the vacuum modulation engine can adjust gate timing, execution order, or routing pathways of the computing system. The vacuum modulation engine adjusts the execution parameters to structure the energy fields based on a calculated modulation field to improve performance of the computing system.

In examples, the vacuum modulation engine combines advanced AI-based control with physical field modeling to create a self-optimizing processor. The vacuum modulation engine continuously monitors bit-level signal conditions and adjusts the modulated field(s) acting on the processor(s) in real time to ensure signals propagate with minimal interference and energy loss. As a result, the computing system maintains high fidelity of bit states and efficient power usage during computation.

Implementations of the described systems and methods improve hardware performance of a computing system. For example, the vacuum modulation engine provides faster execution, lower power usage, and more stability beyond what traditional control loops achieve for computer processing. In addition, the system improves execution efficiency, reduces thermal bottlenecks, and increases system resilience to load fluctuations. For example, the vacuum modulation engine overcomes stochastic constraints in vacuum modeling, eliminates entropic drift in symbolic/logical systems, enhances computational substrates with field-aware control, and enables cross-domain symbolic consistency. Moreover, the described systems and methods enhance information coherence in distributed systems.

The described systems and methods provide an alternative to reliance on stochastic vacuum assumptions. For example, the vacuum modulation engine enables programmable control of vacuum energy density and provides universal modulation framework across symbolic, physical, or computational systems. In addition, the vacuum modulation engine utilizes a modulation field that scales across local and nonlocal interactions without coordinate dependence.

As a result, the described systems and methods provide a new class of hardware and/or software solutions that increases the speed and capabilities of computing systems by modulating elemental vacuum energy fields that influence substantially all aspects of the computing systems.

The approach can be applied to different hardware forms such as general-purpose computer processing units (CPUs), application-specific integrated circuits (ASICs), field-programmable gate arrays (FPGAs), and/or superconducting logic circuits.

FIG. 1 is a partially schematic diagram of an example computing system, generally indicated at 100. The computing system 100 is configured, for example, to perform computer operations. The computing system 100 includes at least one processor 102 and a vacuum modulation engine 104. The vacuum modulation engine 104 is a module implemented in hardware and/or software that monitors signal parameters and adjusts parameters of the processor 102. For example, the vacuum modulation engine 104 can be implemented via electronic circuitry, firmware and/or software instructions executed by a microcontroller, that perform the functions of the vacuum modulation engine 104. The vacuum modulation engine 104 operates the processors 102 as described below to, for example, manipulate and structure vacuum energy fields.

In addition, the computing system 100 may include any other components that facilitate the computing system 100 operating as described. For example, the computing system 100 includes a display device 110, an input device 112, and a memory 116. For example, the input device 112 may include a keyboard, a computer pointer device, a touch screen, a microphone, a camera, and/or any other suitable input device. The computing system 100 may include more or less components in some examples.

The memory 116 may be any type of memory capable of use with the computing system 100. For example, the memory 116 may comprise, but is not limited to, volatile storage (e.g., random access memory), non-volatile storage (e.g., read-only memory), flash memory, or any combination of such memories. For example, the computing system 100 may also include additional data storage media which may comprise devices (removable and/or non-removable) such as, for example, magnetic disks, optical disks, or tape. The memory 116 may include an operating system and one or more program modules or components suitable for performing the various described operations. The operating system may be suitable for controlling the operation of the computing system 100. In some examples, a portion of the memory 116 is stored on a database and accessed via a communication network (e.g., cloud storage).

As stated above, a number of program modules and data files may be stored in the memory 116. While executing on the processor 102, the program modules may perform the various processes including, but not limited to, the aspects of the computing system 100, as described herein. For example, aspects of the vacuum modulation engine 104 are stored on the memory 116 and accessed by the processors 102 when performing operations. The program modules may be incorporated into an operating system, application, middleware, and/or any other program module.

In the example, the computing system 100 includes at least one of the processors 102. For example, the processor 102 may include one or more processing units, graphics units, communications units, system virtualization units and various application functionality all of which are integrated as a single integrated circuit or incorporated into multiple circuits.

Referring to FIG. 1, in addition, the vacuum modulation engine 104 includes a software-defined flux energy modeling module 105 that operates on the processors 102 and is configured to model a vacuum energy field 124 an element 120. The vacuum energy field is a virtual field determined by the vacuum modulation engine 104 to represent an energy field (and associated energy distribution) generated by the element 120, including any ambient or environmental field influences. The vacuum energy field associated with the element 120 may be defined by a zone around the element 120 bounded by one or more dimensions (e.g., a geometric shape having at least three dimensions and encompassing the element 120) that is determined based on characteristics of the element 120. In some examples the fields are determined with variables in two (e.g., x, y systems), three (e.g., x-y-z systems), four (e.g., x-y-z-t systems), or more dimensions. In some examples, the vacuum energy field 124 is not associated with a specific element 120 and is instead defined by a boundary (real or imaginary) and encompasses any energy (e.g., vacuums, electromagnetic fields, etc.) within the boundary.

The vacuum modulation engine 104 is configured to identify the vacuum energy field 124 associated with the element 120. For example, the vacuum modulation engine 104 identifies the element 120 and/or a boundary for the vacuum energy field 124 based on preset operating parameters of the system 100. For example, the vacuum modulation engine 104 may define the boundaries to align with a housing of the system, a determined field of influence for the field, a region of sensitivity or concern, or any other operating parameters. The vacuum modulation engine 104 may determine coordinates in a multi-dimensional (e.g., two, three, or more dimensions) coordinate system to define the boundary. The vacuum modulation engine 104 then identifies the vacuum energy field within the boundary based on the described principles.

The vacuum modulation engine 104 determines a resonant angular frequency of the vacuum energy field 124. For example, the vacuum modulation engine 104 determines the resonant angular frequency by at least one of retrieving the resonant angular frequency from the memory 116, receiving the resonant angular frequency as an input from an external source, receiving a sensor reading related to the resonant angular frequency, and/or calculating the resonant angular frequency. As used herein, the phrases "vacuum resonant angular frequency" or "resonant angular frequency" refers to a frequency at which the vacuum state of an energy field exhibits a peak in response to an external perturbation or due to inherent fluctuations amplified by specific boundary conditions or field interactions. The vacuum resonant angular frequency is a characteristic frequency related to the energy scales and dynamics of the vacuum state of a particular field within a given system or spacetime. The vacuum resonant angular frequency is expressed in radians per second and represented by the symbol "w" in equations. The vacuum-resonant angular frequency may vary as a function of spatial topology, boundary constraints, field configuration, or modulation structure. The vacuum resonant angular frequency is not fixed, and may shift under dynamic conditions imposed by a modulation field, represented by $\phi$s. Therefore, the structured modulation mechanism remains valid across all energetic domains of vacuum fluctuation.

The resonant angular frequency is calculated by determining the specific angular frequency at which a system oscillates with maximum amplitude when driven by an external force. For example for an LC or RLC circuit, the resonant angular frequency is calculated using equation (1).

$$\omega_0 = \frac{1}{\sqrt{LC}} \quad \text{Equation (1)}$$

where L is inductance in Henrys (H) and C is the capacitance in Farads (F).

The vacuum modulation engine 104 is configured to calculate a structured vacuum energy density based on the resonant angular frequency. For example, the vacuum modulation engine is configured to calculate the structured vacuum energy density by multiplying a reduced Planck constant and the resonant frequency and dividing a product of the reduced Planck constant and the resonant frequency by a product of a speed of light to a third power and a square of 2$\pi$. Equation (2) is an equation for calculating the structured vacuum energy density.

$$\rho_{SVE} = \frac{\hbar\omega_v^4}{(2\pi)^2 c^3}\Phi s \quad \text{Equation (2)}$$

where $\rho_{SVE}$ is structured vacuum energy density in Joules per cubic meter (J/m3), $\hbar$ is a reduced Planck constant, $\omega_v$ is the vacuum-resonant angular frequency in radians per second, c is the speed of light in meters per second, and $\phi s$ is the structured modulation field (unitless or normalized).

The modulation mechanism is represented with the symbol "$\phi s$" in these equations but may be represented in other manners and be within the scope of the disclosure. The modulation mechanism is not constrained to any specific symbol or formulation and may represent any deterministic field, operator, or structural logic applied to vacuum space. The modulation mechanism may appear as: scalar, vector, tensor, spinor, topological, or logical field; continuous or discrete; static or time-dependent; mathematical, computational, symbolic, or physical; acting over spacetime, frequency, momentum, or symbolic domains; propagating locally, non-locally, or instantaneously across any topological vacuum manifold; and/or functioning in physical, logical, or representational coordinate systems.

The vacuum modulation engine 104 uses the structured modulation field $\phi s$ to modulate the amplitude or structure of vacuum energy as a deterministic function of frequency and applied field properties. The vacuum modulation engine 104 calculates the structured modulation field to provide a structure or amplitude of the vacuum energy based on predetermined parameters. For example, the vacuum modulation engine 104 calculates the structured modulation field using equations (3) and (4).

$$\Box\phi s + V'(\phi s) = 0 \quad \text{Equation (3)}$$

$$V'(\Phi s) = \lambda\Phi s(\Phi_s^2 - v^2) \quad \text{Equation (4)}$$

where $\Box\phi s$=is a d'Alembert operator represented as $\partial\mu\partial\mu$; $\phi s$ is a structured modulation field in a scalar form; V ($\phi s$) is a scalar potential of $\phi s$; and V'($\phi s$) is a derivative of the scalar potential. In the equation, the d'Alembert operator is a mathematical tool that extends the idea of the Laplacian (which describes how a quantity changes in space) to spacetime, incorporating how that quantity changes with time in a way that is consistent with Einstein's theory of relativity and facilitates describing waves and fields in that framework.

For at least some applications, the equations (3) and (4) may be generalized as equation (5).

$$\partial\mu(f(\phi s)\partial\mu\phi s)=\rho s(x\alpha). \quad \text{Equation (5)}$$

where f($\phi s$) is a tension modulation function, and $\rho s$ is a source/sink excitation or coherence injection.

Based on the calculations, the vacuum modulation engine 104 operates the modulation device 106 to apply the modulation field to the vacuum energy field 124. For example, the modulation device 106 may be incorporated on a processor for a computational simulation platform and the modulation device 106 deterministically modulates vacuum energy fields of the computational simulation platform to generate coherent output states. In another example, the modulation device 106 includes a stimulator (e.g., an antenna) that applies topological modulation to the element 120 according to the modulation field. The topological modulation may include electrical current, light, temperature, and/or any other stimulator. In another example, the modulation device 106 includes an entropy-controlled logic gate that leverages deterministic vacuum fluctuations for state transitions. In a further example, the modulation device 106 includes a data encoding mechanism that applies modulation according to the modulation field to translate or encode data.

The modulation device 106 acting according to the modulation field causes a structured vacuum energy output to result from the vacuum energy field and the applied modulation field. The parameters of the structured vacuum energy output may be calculated using any combination of equations (1)-(5). For example, the structured vacuum energy output is a modulated vacuum energy field that includes vacuum energy arranged in a precise and controlled manner that is predictable based on the disclosed calculations and the applied modulation field and provides tunable characteristics of the system.

The vacuum modulation engine 104 modulates the vacuum energy associated with the element 120 to provide predetermined characteristics according to the structured vacuum energy output. For example, the vacuum modulation engine 104 is configured to determine the structured vacuum energy output and determine vacuum energy fluctuations based on the structured vacuum energy output.

Unexpectedly, control or structuring of the vacuum energy is possible using the disclosed equations and the structured vacuum energy provides precisely tunable characteristics and/or improved performance of systems based on the structured vacuum energy output. For example, the structured vacuum energy output is structured to modify an operating parameter or characteristic of the system 100, the element 120, and/or the environment of the system 100. For example, the modulation device 106 is configured to employ the structured vacuum energy output to regulate, for example and without limitation, at least one of energy density, entropy regulation, symbolic stability, logical propagation, physical structure, or information coherence.

In an example, the vacuum modulation engine 104 is configured to generate a computational simulation platform based on the structured vacuum energy density and the modulation field. The modulation device 106 receives the computational simulation platform from the vacuum modulation engine 104 and is configured to deterministically modulate, using the computational simulation platform, vacuum energy fields based on the structured vacuum energy density to generate coherent output states for symbolic or logical registers.

In another example, the modulation device 106 is configured to apply topological modulation using the modulation field to increase or suppress vacuum-mode coupling. In a further example, the modulation device 106 is configured to operate logic gates using the vacuum energy fluctuations to provide a selected range of energy state transitions. In still further examples, the modulation device 106 is configured to process data based on the vacuum energy fluctuations in information propagation.

In some examples, the vacuum modulation engines 104 provides structured modulation of vacuum energy and influences entropy distributions through deterministic constraints on local and global field variations. The modulation by the vacuum modulation engine 104 results in tunable entropy density, even in the absence of external energy exchange, and governed solely by the behavior of the modulation field.

In some examples, the vacuum modulation engine 104 is generally hardware agnostic and is compatible with a broad range of computing architectures including superconducting bit platforms and any processing units. For example, the vacuum modulation engine 104 applies software-driven resonance tuning among other features and, in some examples, adjusts dynamically based on hardware-specific error profiles. Execution parameters are modified at runtime based on modeled fields, not hardwired behavior. For example, the vacuum modulation engine 104 identifies the hardware platform and determines an error profile that is appropriate for the identified hardware. As such, the vacuum modulation engine 104 is simple and cost-effective to incorporate into or add to existing computing infrastructures.

In examples, at least a portion of the vacuum modulation engine 104 is implemented in different layers and/or components of the computing system 100 or auxiliary systems. For example, the vacuum modulation engine 104 may be implemented in an execution layer that interacts directly with circuits. In one example, the vacuum modulation engine 104 utilizes hardware-embedded execution logic (e.g., field programmable gate arrays, application-specific integrated circuits, etc.) to process instructions. In another example, the vacuum modulation engine 104 is included on a self-contained control unit that pre-processes and optimizes execution without interfacing with external middleware. In some examples, aspects of the vacuum modulation engine 104 are incorporated into an on-chip control system that executes, optimizes, and stabilizes circuits. Such embodiments may operate without interfacing with middleware or requiring input from external sources.

Alternatively, at least some aspects of the vacuum modulation engine 104 are incorporated into offboard sources (e.g., cloud-based systems). For example, aspects of the vacuum modulation engine 104 may utilize cloud-based execution services that process and optimize tasks externally before sending instructions to hardware.

Also, the vacuum modulation engine 104 may rely on networked execution systems in which distributed nodes collaborate in execution without needing middleware coordination. In addition, a protocol for the vacuum modulation engine 104 may optimize and schedule jobs before they reach the processors 102.

In examples, aspects of the vacuum modulation engine 104 are implemented in various stages of processing and pre-processing bit operations. Also, the vacuum modulation engine 104 may use real-time feedback or tracking built into the execution layer. Further, the vacuum modulation engine 104 may implement vacuum energy field stabilization techniques controlled directly by the execution layer.

Execution of the computing system 100 may be decentralized across multiple systems. For example, a blockchain-based execution layer may optimize and validate computations in a distributed network. Also, the computing system 100 may utilize peer-to-peer job execution and leverage execution-level consensus mechanisms. In other examples, the computing system 100 creates a tokenized execution framework that assigns tasks dynamically without a centralized system.

The computing system may have a networking stack where execution synchronization occurs in any layers. In other examples, the computing system may have a network or device-based execution system.

The computing system 100 may include one or more communication systems that enable communication by and between components of the computing system 100 and/or facilitate or otherwise enable the computing system 100 to communicate with remote computing devices. Examples of suitable communication connections include, but are not limited to, radio frequency (RF) transmitter, receiver, and/or transceiver circuitry, and/or universal serial bus (USB), parallel, and/or serial ports. Communication systems may also comprise physical ports (i.e., ethernet or fiber optic) or wireless antenna and supporting hardware which enable the computing system 100 to send or receive data over an internet connection. The communication systems may include a network that is wired and/or wireless and utilizes any suitable communication protocols including, but not limited to, internet, cellular, Wi-Fi, Bluetooth, near-field communication, or other wireless (or wired) communication protocols.

The vacuum modulation engine 104 identifies and models a vacuum energy field 124 associated with an element 120 and operates the modulation device 106 to manipulate the vacuum energy fields 124 around the element 120 using, for example, software-defined flux energy execution modeling. The vacuum energy field 124 may encompass, for example, a coherent electromagnetic field including vacuum energy around the element 120. The vacuum energy fields 124 are structured by applying the modulation field via the modulation device 106. In addition, in some examples, the vacuum modulation engine 104 manipulates the vacuum energy fields 124 in real time by dynamically tuning, for example, the execution parameters of a circuit to compensate for energy fluctuations. The vacuum energy fields 124 remain structured during operations and prevent distortion due to the operations of the vacuum modulation engine 104. For example, the vacuum modulation engine 104 is configured to selectively control gates based on the vacuum energy fields 124 around the element 120 to modulate the element 120.

In some examples, the vacuum modulation engine 104 determines an operating status of each element 120 and/or the system 100 or a predicted operating status of each element 120 and/or the system 100 before the modulation field is applied to the vacuum energy field 124. The vacuum modulation engine 104 then operates the modulation device 106 to manipulate the vacuum energy fields 124 based on the operating status of the element 120 and/or the system 100 or the predicted operating status of the element 120 and/or the system 100. The vacuum modulation engine 104 alters the determined operating status of the element 120 and/or the system 100 and/or causes the element 120 and/or the system 100 to arrive at the predicted operating status based on the modulation field.

The vacuum modulation engine 104 includes an artificial intelligence (AI) module 126 that is configured to determine operating parameters of the system 100 in real-time to further improve performance of the system 100. In the example, the AI module 126 includes a generative AI platform designed to synthesize novel data or solutions based on learned patterns and constraints. Additionally or alternatively, the AI module 126 many employ any suitable AI platform(s). The specific AI platform(s) employed within the AI module 126 can be dynamically selected or combined based on the requirements of the processor 102, the nature of the input data, and the desired output characteristics. Examples of AI platforms that may be included in the AI module 126 include, without limitation, machine learning, neural networks, reinforcement learning, symbolic AI, hybrid AI platforms, and/or any other AI platforms. Further, the AI module 126 could be implemented using custom-designed AI platforms, tailored to the specific requirements of the vacuum modulation engine 104 and/or the modulation device 106.

The AI module 126 of the vacuum modulation engine 104 facilitates the vacuum modulation engine 104 dynamically adjusting the modulation device 106 in real time to improve performance of a system incorporating the element 120. For example, the AI module 126 continuously refines the modulation field delivered by the modulation device 106 based on real-time execution feedback to improve overall stability.

The AI module 126 of the vacuum modulation engine 104 employs optimization algorithms, such as genetic algorithms, gradient descent, or particle swarm optimization, to explore the design space of software-driven modifications. Machine learning techniques, such as reinforcement learning or supervised learning, are incorporated to refine optimization strategies based on the modeled vacuum energy fields. The vacuum modulation engine 104 generates optimized software parameters, which are then validated through further modeling, to ensure compliance with performance and reliability specifications.

The AI module 126 includes a prediction unit. For example, the AI module 126 runs simulations based on the vacuum energy field 124 and/or the possible operating parameters of the element 120 and/or the system 100. The AI module 126 calculates the possible structured vacuum energy outputs that and selects the modulation field that provides a desired characteristic or operating parameter of the element 120 and/or the system 100.

The AI module 126 utilizes any suitable training database. For example, the AI module 126 may be trained using a database of physics principles, equations and algorithms described herein, and any other suitable information. In addition or alternatively, the AI module 126 may utilize machine learning. For example, the AI module 126 may store, evaluate, and learn from operations modeled and/or implemented during operation. The AI module 126 may compare parameters for different models based on the vacuum energy field information received from modules and select optimal structures based on the comparison. For example, the AI module 126 can utilize an inference model including predictive analytics and decision making. In addition, the AI module 126 can utilize feedback-based adaptive correction, and/or reinforcement learning.

In examples, the system 100 utilizes special purpose machines and components that are designed and constructed for manipulating vacuum energy fields. For example, the components are free of shielding (e.g., electromagnetic shielding) that would inhibit the manipulation fields structuring the vacuum energy fields in at least the section around the element(s) 120. Specifically, there is no shielding between the modulation device 106 and the vacuum energy field 124 associated with the element 120 in the system 100.

Figure 2:
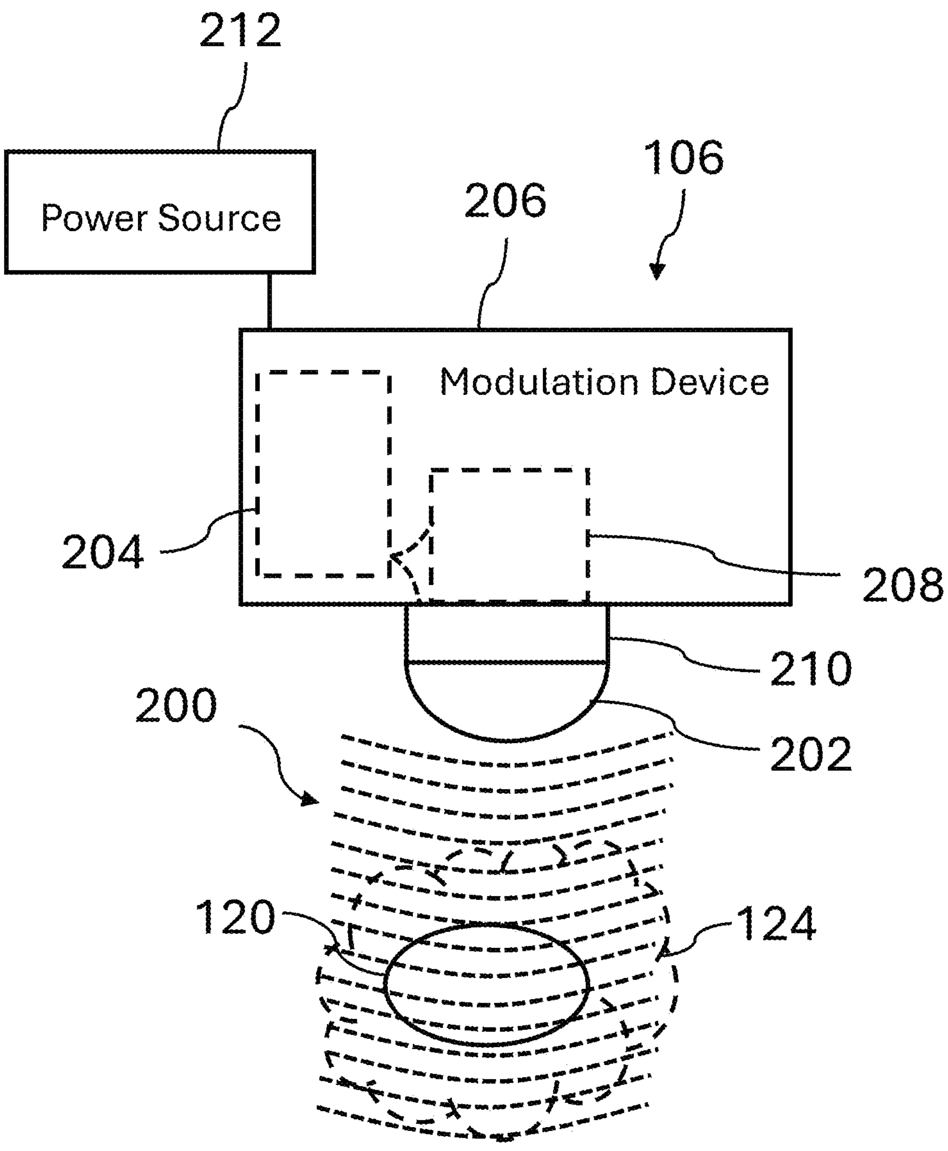
FIG. 2 is a partially schematic diagram of an example of the modulation device configured to deliver a modulation field to an element.

FIG. 2 is a partially schematic diagram of an example of the modulation device 106 configured to deliver the modulation field 200 to the element 120. The modulation device 106 includes any mechanism that is capable of delivering a modulation field to the element 120. For example, the modulation device 106 includes without limitation a light source, an energy source, a vacuum generator, a heater, and/or a speaker. In the example illustrated in FIG. 2, the modulation device 106 includes a field generator 208, a regulator 210, an emitter 202, a controller 204, and a housing 206.

The housing 206 at least partly encloses and/or supports the field generator 208, the regulator 210, the emitter 202, and the controller 204. For example, the housing 206 provides physical support and environmental protection for the other components of the modulation device 106. In some examples, the housing 206 shields the device from external interference and/or facilitates directing the modulation field 200. For example and without limitation, the housing 206 may include a plastic or metal enclosure, a vacuum chamber, and/or a waveguide structure to contain and direct electromagnetic waves. For example, if the modulation device 106 is configured to apply topological modulation, the housing may maintain a specific temperature or pressure required for the topological phase of the material, include integrated waveguides or optical elements that efficiently couple to and extract the modulated field from the topological material, and/or shielding against magnetic fields that could disrupt the topological states. The housing 206 is free of any shielding that would extend between the emitter 202 and the target.

The emitter 202 is configured to introduce or launch the field that is to be modulated. The emitter 202 is selected based on the type of field being modulated. For example, for an electromagnetic field the emitter 202 may include an antenna (for radio waves), a laser diode (for light), a microwave horn (for microwaves), and/or a cascade laser (for terahertz radiation). For acoustic waves, the emitter 202 may include a piezoelectric transducer, a MEMS speaker, and/or an ultrasonic transducer. For a spin wave (Magnonic), the emitter 202 may include a microstrip antenna or a spin-orbit torque (SOT) device used to excite magnons in a magnetic material. For a topological modulator, the emitter 202 includes mechanisms configured to excite topologically protected modes or edge states within the modulator material such as a specifically patterned antenna designed to couple to chiral edge states in a topological insulator at a particular frequency, and/or a focused laser beam configured to excite specific topological excitations (e.g., skyrmions or domain walls) in a topological magnetic material.

The field generator 208 creates the initial energy or excitation that the emitter 202 shapes into the field to be modulated. In some cases, the emitter 202 and the field generator 208 are integrated into a single component. In examples, the field generator 208 may include electromagnetic waves, an oscillator circuit that produces a specific frequency signal, and/or a current source driving an antenna. For acoustic waves, the field generator 208 may include an oscillating voltage source applied to a piezoelectric crystal. For a spin wave, the field generator 208 may include a microwave source providing the initial energy to excite magnons. For a topological modulator, the field generator may include precisely controlled current source designed to inject spin-polarized electrons into a topological insulator to excite specific spin textures and/or a laser with a specific wavelength and polarization chosen to efficiently excite quasiparticles in a topological superconductor.

The controller 204 includes one or more processors that act as the central processing unit of the modulation device 106. The controller 204 receives input signals (e.g., electrical control voltages, optical signals, digital commands) and sends the necessary control signals to the regulator 210 and potentially the field generator 208 and the emitter 202. The controller 204 communicates with external components, determines (e.g., calculates or receives) parameters such as the modulation factors and/or the structured vacuum energy output, and dictates the nature and timing of the modulation applied to the field. For example, the controller 204 includes a microcontroller or FPGA (Field-Programmable Gate Array) executing a modulation algorithm, analog circuitry that generates control waveforms (e.g., sinusoidal, square, pulsed), and/or a digital signal processor (DSP) implementing complex modulation schemes.

The regulator 210 directly interacts with the field generated by the emitter 202 and modifies the properties of the field according to the control signals received from the controller 204. The regulator 210 is selected based on the type of fields that are manipulated. For example, for electromagnetic fields, the regulator 210 may include a variable attenuator (for amplitude modulation), a phase shifter (for phase modulation), a polarizer (for polarization modulation), and/or a voltage-controlled oscillator (for frequency modulation). For acoustic systems, the regulator 210 may include a variable acoustic impedance element and/or an array of transducers with individually controlled phases (for beam steering and shaping). For a spin wave, the regulator 210 may include a gate electrode applying an electric field to modify the magnetic properties and thus the spin wave propagation, and/or a patterned magnetic layer creating a potential landscape for magnons. For a topological modulation field, the regulator 210 may include agate electrodes fabricated on a topological insulator to electrostatically control the Fermi level and thus the conductivity of the surface states, a patterned magnetic layer placed near a topological superconductor to induce and manipulate *Majorana* bound states, and/or an optical beam used to locally heat or excite a topological material to alter a topological phase or the properties of edge states and modulate the transmission of another signal.

In the example, the modulation device 106 is connected to a power source 212. The power source 212 may be any suitable power source. In some examples, the power source 212 is a battery mounted on the modulation device 106 and/or an external power supply and the power source 212 is configured to deliver electrical power. In other examples, the power source 212 delivers power for the modulation device 106 utilizing any suitable fuel. In some examples, the modulation device 106 (and/or the system 100 shown in FIG. 1) derives at least some power from the structured vacuum energy fields. For example, the modulation fields 200 from the modulation device 106 may be delivered to the field to structure the field in such a manner that the structured vacuum energy output includes energy that is released or extracted from the vacuum energy field and used to charge a battery of the power source 212 and/or directly power components such as the modulation device 106 and/or external systems.

During operation, the modulation device 106 delivers the modulation field 200 to the element 120 when power is supplied to the emitter 202. For example, the field generator 208 generates the modulation field 200 when supplied with power. The regulator 210 adjusts the modulation field 200 according to the calculated modulation factor to reach the determined structured vacuum energy output. The emitter 202 discharges the modulation field and directs the modulation field toward the element 120. The modulation field 200 interacts with the vacuum energy field 124 of the element 120 and modifies the vacuum energy field 124 into a structured pattern according to the structured vacuum energy output.

Figure 3:
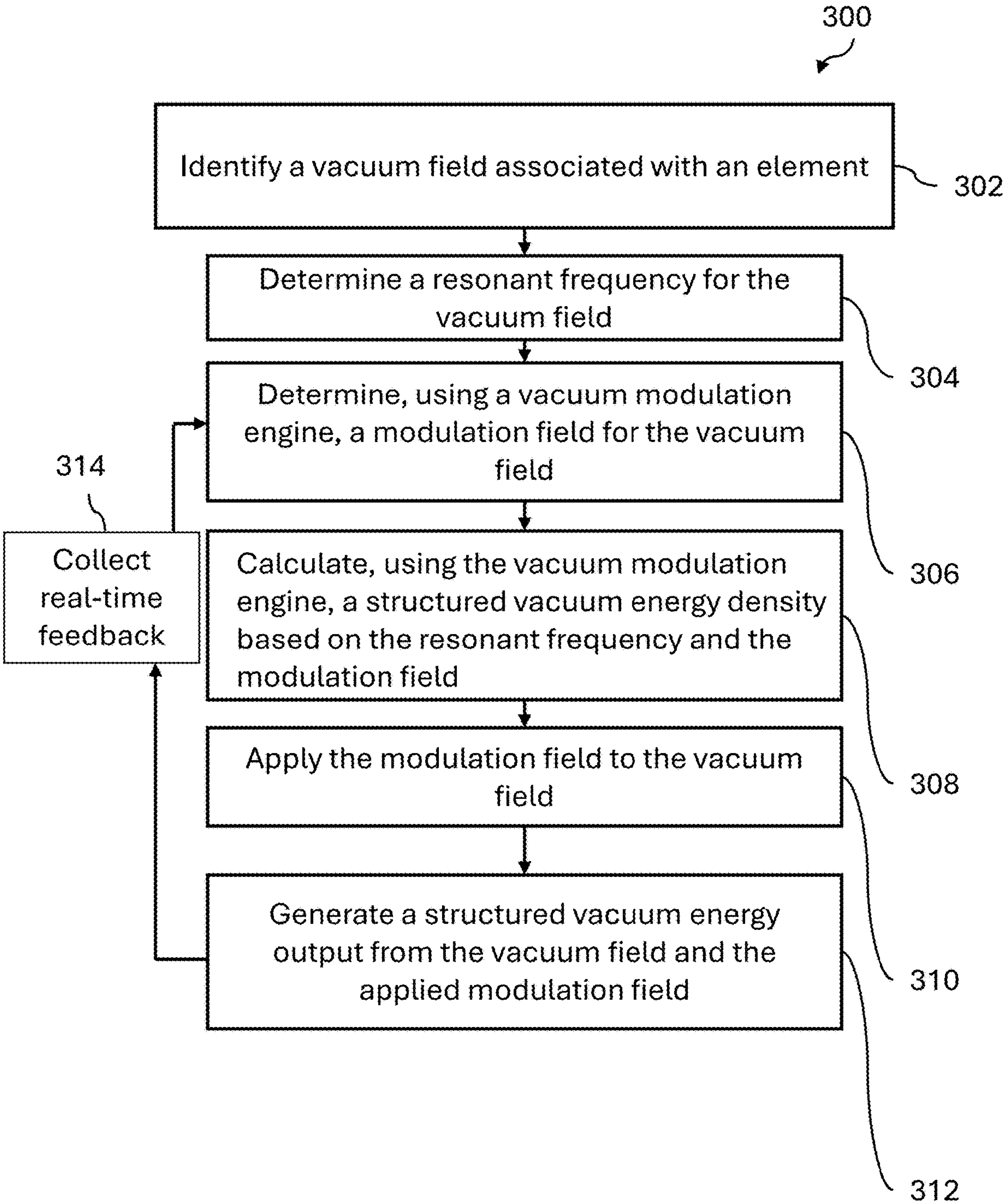
FIG. 3 is a flow diagram of an example method for generating a structured vacuum energy field.

FIG. 3 is a flow diagram of an example method 300 for generating a structured vacuum energy field (e.g., the vacuum energy field 124 shown in FIG. 1) associated with an element (e.g., the element 120 shown in FIG. 1) to regulate operating parameters of the element. For example, a non-transitory computer-readable medium stores instructions that, when executed by a processor, cause the processor to perform the method 300.

Referring to FIGS. 1-3, in the method 300, a vacuum modulation engine (e.g., the vacuum modulation engine 104) identifies 302 a vacuum energy field (e.g., the vacuum energy field 124) associated with an element (e.g., the element 120). For example, the vacuum modulation engine utilizes a computational model that simulates structured vacuum energy field for the element 120 based on characteristics of the element 120 provided by feedback sensors, received from an external input, and/or retrieved by the vacuum modulation engine from a database.

The vacuum modulation engine determines 304 a resonant frequency for the vacuum energy field. For example, the vacuum modulation engine calculates the resonant frequency based on information about the element and/or a model of the element, the vacuum modulation engine receives the resonant frequency from an external input, and/or the vacuum modulation engine retrieves the resonant frequency from a database.

The vacuum modulation engine determines 306 a modulation field for the vacuum energy field. For example, the vacuum modulation engine uses any of equations (1)-(5) to calculate the modulation field, the vacuum modulation engine receives the modulation field from an external input, and/or the vacuum modulation engine retrieves the modulation field from a database.

Based on the resonant frequency and the modulation field, the vacuum modulation engine calculates 308 the structured vacuum energy density. For example, the vacuum modulation engine uses any of equations (1)-(5) to calculate the structured vacuum energy density. For example, the structured vacuum energy density is calculated by multiplying a reduced Planck constant and the resonant frequency and dividing a product of the reduced Planck constant and the resonant frequency by a product of a speed of light to a third power and a square of $2\pi$.

A modulation device (e.g., the modulation device 106 shown in FIG. 1 or 2) applies 310 the modulation field to the vacuum energy field. For example, the modulation device emits a field modulated in accordance with determinations of the vacuum modulation engine. In examples, the modulated field is a continuous or discrete field. In further examples, the modulated field has a time characteristic and is time-dependent. In other examples, the modulated field is static. The modulated field may be modulated over space-time, frequency, momentum, and/or symbolic domains.

In the method 300, the application of the modulation field to the vacuum energy field generates 312 a structured vacuum energy output. The structured vacuum energy output is structured to modify an operating parameter of the element and/or any system influenced by the element of the structured vacuum energy field. For example, the structured vacuum energy output may be employed to regulate at least one of energy density, entropy regulation, symbolic stability, logical propagation, physical structure, or information coherence of a system. In an example, the method 300 includes deterministically modulating, using a computational simulation platform, vacuum energy fields based on the structured vacuum energy density to generate coherent output states for symbolic or logical registers. In some examples, the modulation device acts according to the vacuum modulation engine to apply topological modulation using the modulation field to increase or suppress vacuum-mode coupling.

In some examples, the vacuum modulation engine determines vacuum energy fluctuations based on the structured vacuum energy output. For example, the vacuum modulation engine operates entropy-controlled logic gates using the vacuum energy fluctuations. The vacuum energy fluctuations are determined to provide a selected range of energy state transitions. In another example, the vacuum modulation engine processes data based on the vacuum energy fluctuations.

In examples, the vacuum modulation engine collects 314 real-time feedback before, during, and/or after application of the modulation field to the vacuum energy field. The real-time feedback facilitates precise tuning of the modulation field and instantaneous or preemptory corrections to the modulation field. The real-time feedback is collected 314 using sensors detecting operating parameters and/or based on results of computer modeling performed during operation of the system.

Figure 4:
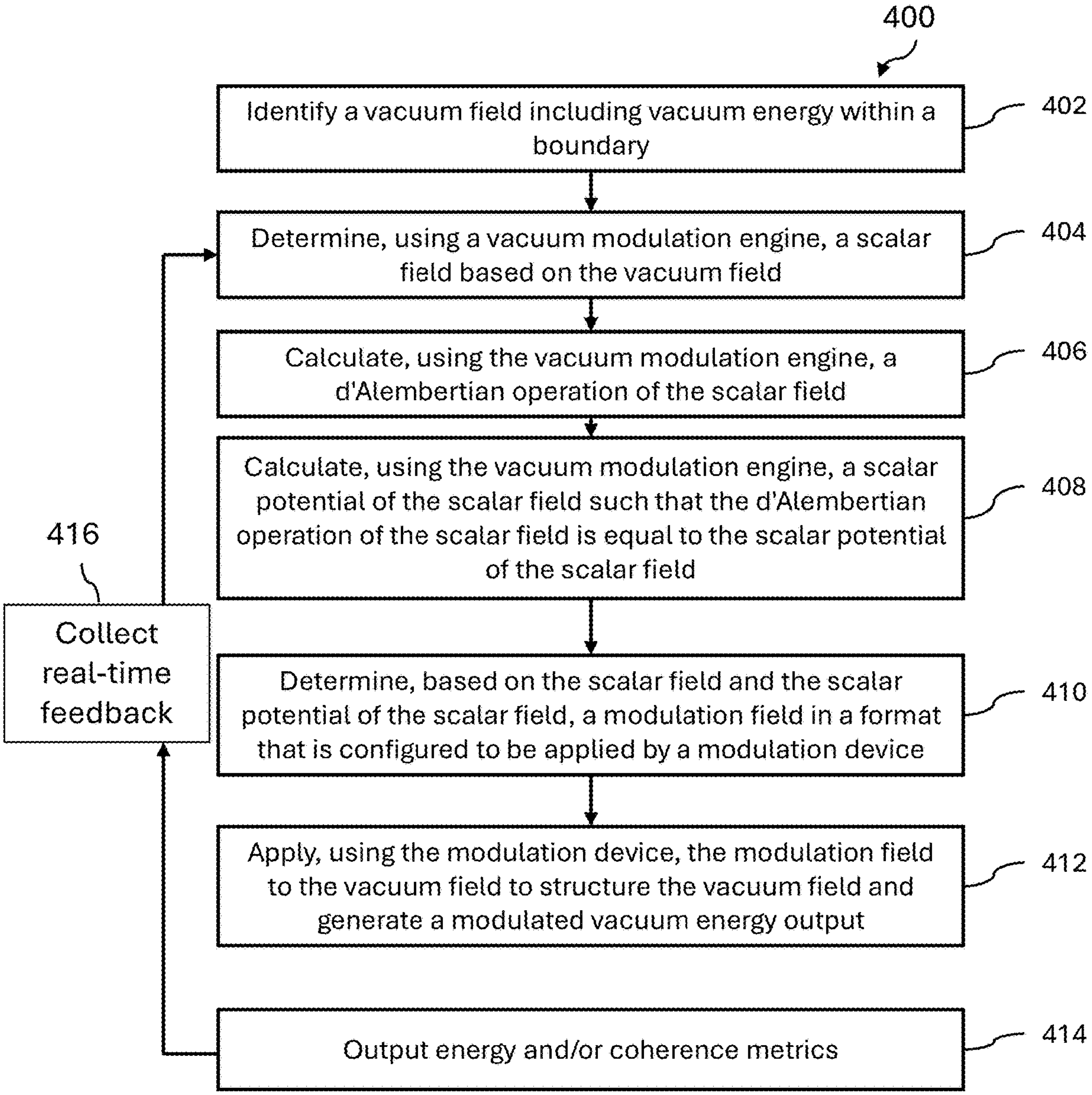
FIG. 4 is a flow diagram of an example method for modulating vacuum energy fields.

FIG. 4 is a flow diagram of an example method 400 for modulation of vacuum energy fields. For example, a non-transitory computer-readable medium stores instructions that, when executed by a processor, cause the processor to perform the method 400.

Referring to FIGS. 1, 2, and 4, in the method 400, a vacuum modulation engine (e.g., the vacuum modulation engine 104) identifies 402 a vacuum energy field (e.g., the vacuum energy field 124). For example, the vacuum energy field includes vacuum energy within a boundary. The vacuum modulation engine is implemented in at least one of a hardware, firmware, or symbolic platform.

The vacuum modulation engine determines 404 a scalar field based on the vacuum energy field. For example, the vacuum modulation engine calculates the scalar field, the vacuum modulation engine receives the scalar field from an external input, and/or the vacuum modulation engine retrieves the scalar field from a database. The vacuum modulation engine may use any of equations (1)-(5) and/or any other equations to calculate the modulation field.

Also in the method 400, the vacuum modulation engine calculates 406 a d'Alembertian operation of the scalar field. For example, the d'Alembertian operation is a mathematical tool that extends the idea of the Laplacian (which describes how a quantity changes in space) to spacetime, incorporating how that quantity changes with time in a way that is consistent with Einstein's theory of relativity and facilitates describing waves and fields in that framework.

In the method 400 the vacuum modulation engine calculates 408 a scalar potential of the scalar field such that the d'Alembertian operation of the scalar field is equal to the scalar potential of the scalar field. For example, if the scalar field is applied for adaptive tension modulation, the scalar field is calculated to satisfy the equation (5). In examples, a mathematical transformation is applied to the scalar field. Examples of the mathematical transformation include at least one of a mathematical operation, isomorphisms, domain substitutions, nonlinear embeddings, or variational parameterizations. The mathematical transformation may be used to replace the scalar field with an equivalent value that facilitates a different format of the computations or values.

The vacuum modulation engine determines 410, based on the scalar field and the scalar potential of the scalar field, a modulation field in a format that is configured to be applied by a modulation device. For example, the modulation field may include an electric current, a wave, light, sound, electromagnetism, vacuum energy, and/or any suitable field. In examples, the modulation field is represented by one of a symbolic, tensorial, logical, topological, or algorithmic representation.

The modulation device applies 412 the modulation field to the vacuum energy field to structure the vacuum energy field and generate a structured vacuum energy output. For example, the modulation field is selected to and causes entropy suppression, coherence retention, and symbolic propagation when the modulation field is applied to the vacuum energy field. In examples, the modulation of the vacuum energy field is determined using an entropy trace analysis, coherence spectral signatures, symbolic propagation variance, or energy fluctuation profiles based on the scalar field.

The application of the modulation field outputs 414 energy and/or coherence metrics. The metrics define how the structured vacuum energy output has performed. In addition, the energy and/or coherence metrics can provide information on opportunities to improve performance. The vacuum modulation engine collects 416 real-time feedback such as the energy and/or coherence metrics in a feedback loop and the vacuum modulation engine utilizes the performance to adjust the determination of the modulation field or the determination of future modulation fields.

In some examples, the vacuum modulation engine determines or measures modulation of the vacuum energy field after applying the modulation field to the vacuum energy field. For example, the vacuum modulation engine calculates the actual modulated vacuum energy and compares the modulated vacuum energy to an initial vacuum energy or to a predicted vacuum energy and determines the differences. In addition or alternatively, the vacuum modulation engine compares the modulated vacuum energy to a target vacuum energy. The vacuum modulation engine can make changes to the modulation field based on differences between the calculated values. For example, if a difference between any of the values is greater or less than a threshold amount, the vacuum modulation engine adjusts the modulation field to reduce or increase the difference, respectively.

In an example, the vacuum modulation engine calculates a structured vacuum energy density of the structured vacuum energy output by multiplying a reduced Planck constant and a resonant frequency and dividing a product of the reduced Planck constant and the resonant frequency by a product of a speed of light to a third power and a square of $2\pi$.

Figure 5:
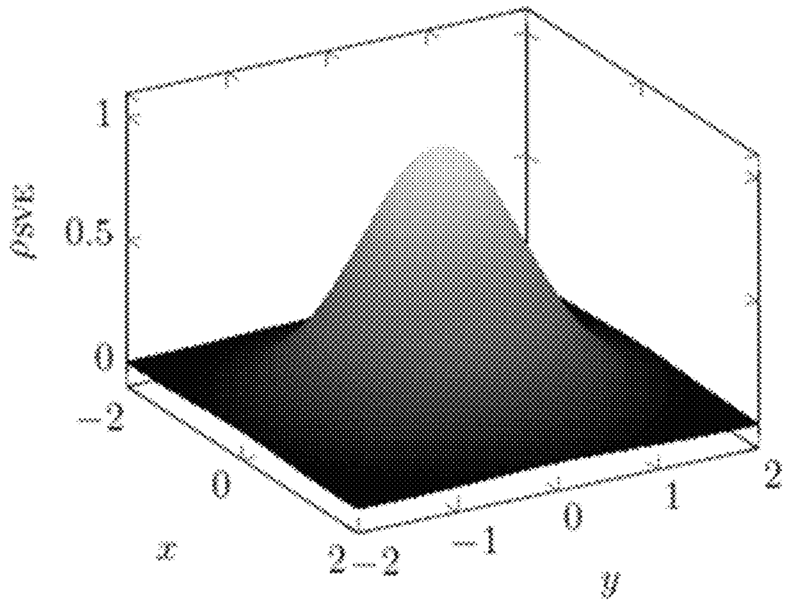
FIG. 5 is a multi-dimensional surface plot generated from an exponential modulation profile showing application of a modulation field.

FIG. 5 is a multi-dimensional surface plot generated from an exponential modulation profile showing a modulation field, represented by the symbols "ϕs (x, y)". The surface plot depicts structured vacuum energy density, denoted with the symbol "pSVE". The vertical axis represents the value of vacuum energy density, while the horizontal plane is defined by x and y coordinates. The surface plot was generated from an exponential modulation profile and demonstrates the influence of the modulation field ((Ds(x, y)) on the structured vacuum energy density (ρSVE). The surface of the plot illustrates a peak, or mound, with the highest density located at the center (x=0,y=0) and decreasing radially outwards. The shape of the surface plot is characteristic of an exponential modulation profile.

Figure 6:
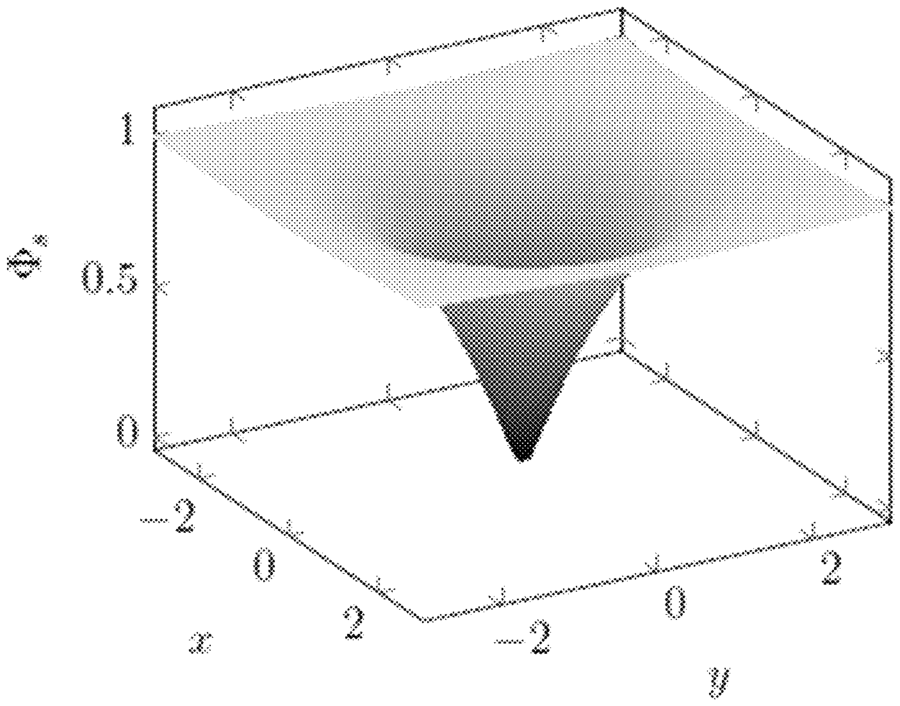
FIG. 6 is a multi-dimensional surface plot of a modulation field illustrating a derived solution for a modulation field obtained from a Higgs-type potential.

FIG. 6 is a multi-dimensional surface plot of a modulation field, represented by the symbols "ϕs(x, y)". The surface plot illustrates a derived solution obtained from a Higgs-type potential. The plot shows the value of the modulation field (ϕs) on the vertical axis as a function of variables x and y on the horizontal plane. The surface plot visually represents a symbolic domain separation. For example, the surface plot demonstrates a radial kink structure representing symbolic domain separation and exhibiting topological field transitions. The radial kink structure is characterized by higher values of the modulation field (ϕs) in the peripheral regions and a distinct minimum or depression towards the center.

Figure 7:
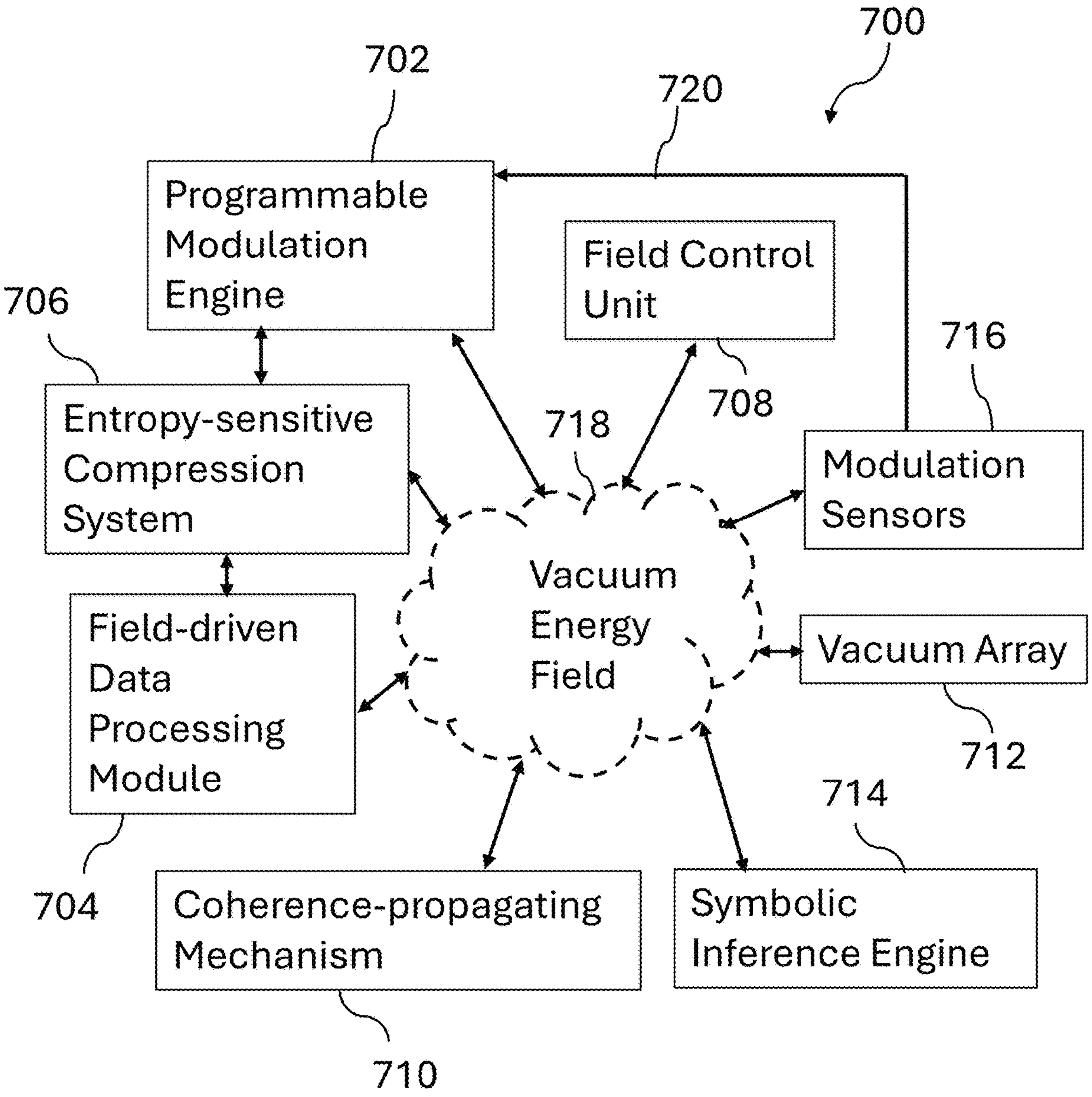
FIG. 7 is a box diagram of an example system for manipulating structured vacuum energy interactions to process data.

FIG. 7 is a box diagram of an example system 700 for manipulating structured vacuum energy interactions to process data. The system 700 includes hardware components such as programmable modulation engine(s) 702, field-driven data processing module(s) 704, entropy-sensitive compression system(s) 706, topology-adaptive field control unit(s) 708, coherence-propagating mechanism(s) 710, vacuum array(s) 712, symbolic inference engine(s) 714, and/or feedback-coupled modulation sensor(s) 716. In the example, the programmable modulation engines 702 are core units that are responsible for actively manipulating the properties of a vacuum energy field 718 within a defined spatial and temporal region. The programmable modulation engines 702 are configured to generate various types of field modulations, such as changes in vacuum energy density, fluctuations, or potentially even topological structures within the field. The programmable modulation engines 702 act as the actuators of the system 700. By precisely controlling parameters (e.g., frequency, amplitude, spatial distribution of applied energy or fields), the programmable modulation engines 702 induce the desired modulations in the vacuum energy field and facilitate a wide range of experiments, data encoding schemes, or even potential energy extraction protocols.

The field-driven data processing modules 704 directly utilize the modulated vacuum energy field as a medium for computation or information processing. Information is encoded in the specific states or patterns of the vacuum energy field modulations. The field-driven data processing modules 704 are designed to interact with and read out modulated states to perform logical operations or data transformations. The field-driven data processing modules 704 utilize the modulated vacuum energy fields and represent a paradigm shift in computation. Instead of relying on electronic or photonic signals, the field-driven data processing modules 704 leverage the inherent properties of the vacuum energy field 718 itself for processing.

The entropy-sensitive compression systems 706 are designed to analyze the information content or complexity (entropy) of the vacuum energy field modulations. Based on this analysis, the entropy-sensitive compression systems 706 dynamically adjust the parameters of the modulation engines 702 and/or the data processing modules 704 to achieve efficient encoding and transmission of information. The entropy-sensitive compression systems 706 efficiently compress and facilitate processing information in widespread practical applications by utilizing the high dimensionality and complexity of vacuum energy field states. For example, the entropy-sensitive compression systems 706 utilize the compression algorithms specifically tailored to the unique characteristics of vacuum energy field data based on the modulation field and perform compression in real-time based on the calculated fields.

The topology-adaptive field control units 708 focus on the creation and manipulation of topological structures within the vacuum energy field 718. The topology-adaptive field control units 708 dynamically create, modify, and stabilize these non-trivial field configurations (e.g., analogous to solitons or instantons in field theories). Topological structures in energy fields are often associated with stability and unique properties. The ability to control and manipulate the topological structures provides new forms of information storage, robust computation, and/or improved energy transfer techniques.

The coherence-propagating vacuum arrays 712 are structured arrangements of components designed to enhance and direct the propagation of coherent excitations or modulations within the vacuum energy field over extended spatial or temporal scales. The coherence-propagating vacuum arrays 712 enable the reliable transmission of information encoded in vacuum energy field modulations or facilitate long-range interactions mediated by the vacuum.

The symbolic inference engines 714 are designed to perform high-level reasoning and deduction based on symbolic representations of the vacuum energy field states, modulations, and the outcomes of field-driven processes. The symbolic inference engines 714 operate on abstract symbols that represent complex energy field configurations or the results of computations performed within the vacuum. For example, the symbolic inference engines 714 provide automated discovery of new modulation protocols, error correction in vacuum-based computation, and/or high-level control of the topology-adaptive units based on the vacuum energy fields 718.

The feedback-coupled modulation sensors 716 are highly sensitive sensors designed to precisely measure the properties of the modulated vacuum energy field 718. The modulation sensors 716 are coupled to and sending readings to the data processing modules 704 via a feedback loop 720. Readings from the feedback-coupled modulation sensor 716 are used to dynamically adjust the parameters of the data processing modules 704, creating a closed-loop control system for achieving and maintaining desired vacuum energy field states. This feedback loop facilitates precise manipulation and correction of any deviations from the intended modulations because the feedback loop provides accurate and real-time monitoring of the vacuum energy field. As a result, the feedback loop facilitates stability and control of the system in real-time.

The system 700 is an example application of modulation of vacuum energy fields. In further examples within the scope of the disclosure, the system 700 may include more, less, and/or different components. In addition, each of the components of the system 700 may be utilized individually, in different combinations, and/or incorporated into any of the described systems (e.g., systems 100 and 700).

Computer-Executable Instructions

The following programming code implements the above described equations in computer executable instructions.

Program 1:

```
#
========================================================================
#
# Structured Vacuum Energy (SVE) — is a deterministic modulation-based energy framework
# derived from a generalized modulation field φ_s. It replaces the stochastic interpretation
# of vacuum behavior with programmable field structure. The modulation may be scalar, vector,
# tensor, logical, or symbolic — capable of shaping the symbolic or physical vacuum topology
# across generalized coordinate domains (e.g., spatial, temporal, logical, or frequency
# domains).
```

-continued

Program 1:

```
#
# This reference implementation demonstrates:
# - Spationtemporal modulation via deterministic field ϕs(x, y, z, t)
# - Geometrically modulated vacuum resonance ωv(x, y, z, t)
# - Real-time computation of structured vacuum energy density ρsve
#
# The system is mathematically consistent with the formulation:
#    ρsve = (ℏ · ωv^4) / ((2π)^2 · c^3) ϕs
#
# Output units are rendered in [J/m^3] and consistent with physical vacuum
energy scaling.
# This simulation aligns with the symbolic field architecture defined in the
SVE filing
#
============================================================
# Structured Vacuum Energy — 4D Field Model Prototype
# Author       : Sean W. Null — Inventor
# #
============================================================
# ----------------------------------------------------------------------------
# TECHNICAL STATEMENT OF PURPOSE
# ----------------------------------------------------------------------------
# This system numerically evaluates the SVE field equation using
deterministic symbolic
# inputs. It computes:
#
# ρsve(x, y, z, t) = (ℏ · ωv^4) / ((2π)^2 · c^3) ϕs · ϕs(x, y, z, t)
#
# ...where:
# ϕs(x, y, z, t) defines a structured modulation field across 4D coordinates
# - ωv(x, y, z, t) defines the vacuum resonance angular frequency tied to
spatial topology
#
# This computational model demonstrates real-time symbolic shaping of
vacuum energy
# density — fulfilling multiple non-stochastic claims defined in the SVE
framework.
# ----------------------------------------------------------------------------
# ----------------------------------------------------------------------------
# CORE SYSTEM FUNCTIONS
# ----------------------------------------------------------------------------
# • phi_s(x, y, z, t)     – Gaussian × temporal cosine modulation function ϕs
# • omega_v(x, y, z, t)     – Spatial frequency basis ωv with time-varying
amplitude
# • rho_sve(x, y, z, t)     – Core structured vacuum energy equation (real-
valued field)
# • plot_rho_sve(...)     – Visualization engine for SVE surface at z=0, t=0
#
# All field outputs are rendered in SI units and are suitable for export to
symbolic solvers.
# ----------------------------------------------------------------------------
# ----------------------------------------------------------------------------
# SYMBOLIC EXECUTION FLOW — ARCHITECTURE OVERVIEW
# ----------------------------------------------------------------------------
#
┌──────────────────────────────────────────────────────────────┐
# | Structured Vacuum Modulation – Symbolic Flow              |
# |
┌──────────────────────────────────────────────────────────┐
# | | Step 1: Initialize 4D coordinate mesh (x, y, z, t)             | |
# | | Step 2: Evaluate field modulation ϕs(x, y, z, t)             | |
# | | Step 3: Compute vacuum resonance ωv(x, y, z, t)             | |
# | | Step 4: Evaluate ρsve(x, y, z, t) from core SVE equation        | |
# | | Step 5: Output or visualize vacuum energy distribution [J/m^3]       | |
# |
└──────────────────────────────────────────────────────────┘  |
#
└──────────────────────────────────────────────────────────────┘
# ----------------------------------------------------------------------------
import numpy as np
import matplotlib.pyplot as plt
from mpl_toolkits.mplot3d import Axes3D # Required for 3D plotting
context
# ---------------------
# Constants (SI Units)
# ---------------------
H_BAR = 1.0545718e-34     # Reduced Planck constant ℏ (J·s)
```

-continued

Program 1:

```
C = 299 792 458        # Speed of light in vacuum (m/s)
# ------------------------------------------------------------
# Modulation Field φs(x, y, z, t)
# Encodes structure in vacuum topology using a Gaussian-cosine field
# ------------------------------------------------------------
def phi_s(x, y, z, t):
    spatial_decay = np.exp(−(x**2 + y**2 + z**2))
    temporal_mod = np.cos(2 * np.pi * t)
    return spatial_decay * temporal_mod
# ------------------------------------------------------------
# Vacuum Resonant Frequency ωv(x, y, z, t)
# Represents spatial topology-driven frequency basis
# ------------------------------------------------------------
def omega_v(x, y, z, t):
    spatial_radius = np.sqrt(x**2 + y**2 + z**2)
    return spatial_radius * 1e15 * (1 + 0.1 * np.sin(t)) # Temporal frequency
adjustment
# ------------------------------------------------------------
# Structured Vacuum Energy Density ρSVE(x, y, z, t)
# Core formula encoding deterministic vacuum energy field
# ------------------------------------------------------------
def rho_sve(x, y, z, t):
    wv = omega_v(x, y, z, t)
    phi = phi_s(x, y, z, t)
    coefficient = H_BAR / ((2 * np.pi)**2 * C**3)
    return coefficient * (wv**4) * phi
# ------------------------------------------------------------
# Visualization (slice at z = 0, t = 0)
# ------------------------------------------------------------
def plot_rho_sve(x, y, rho):
    fig = plt.figure(figsize=(8, 6))
    ax = fig.add_subplot(111, projection='3d')
    ax.plot_surface(x, y, rho, cmap='plasma', edgecolor='none')
    ax.set_title('Structured Vacuum Energy Density ρSVE(x, y, z=0, t=0)')
    ax.set_xlabel('x [m]')
    ax.set_ylabel('y [m]')
    ax.set_zlabel('ρSVE [J/m^3]')
    plt.tight_layout( )
    plt.show( )
# ------------------------------------------------------------
# Execution Block
# ------------------------------------------------------------
if__name__ == "__main__":
    grid_range = np.linspace(−2, 2, 200)
    X, Y = np.meshgrid(grid_range, grid_range)
    Z = np.zeros_like(X) # z = 0 plane
    T = np.zeros_like(X) # t = 0 snapshot
    RHO = rho_sve(X, Y, Z, T)
    center_val = RHO[RHO.shape[0]//2, RHO.shape[1]//2]
    print(f"Sample ρSVE at (x=0, y=0, z=0, t=0): {center_val:.3e} J/m^3")
    plot_rho_sve(X, Y, RHO)
```

Program 2:

```
============================================================
#
# Structured Vacuum Energy (SVE) — Canonical Scalar Field Modulation (4D
Extended)
# Derived from the deterministic scalar field equation:
# □φ_s + V'(φ_s) = 0, with V(φ_s) = (λ/4) (φ_s^2 − v^2)^2
#
# This reference implementation demonstrates:
# - Spatiotemporal modulation via radial kink scalar field φ_s(x, y, z, t)
# - Vacuum resonance basis ω_v(x, y, z, t) tied to topological curvature
# - Real-time symbolic energy computation ρ_sve(x, y, z, t) in SI units [J/m^3]
#
# The system is mathematically and symbolically consistent with
# "SWN_SVE_Base" and enforces aspects through functional realization of:
ρ_sve = (ℏ · ω_v^4)/((2π)^2 · c^3) · φ_s
#
# Output values are consistent with physical vacuum energy scaling and are
suitable
# for symbolic inference engines, entropy-aware hardware models, and AI
substrates.
# ============================================================
# ==============================================
# Structured Vacuum Energy — Scalar Field Modulation Engine
# Author       : Sean W. Null — Inventor
# -------------------------------------------------------------------------------
```

-continued

Program 1:

```
# --------------------------------------------------------------------------------
# TECHNICAL STATEMENT OF PURPOSE
# --------------------------------------------------------------------------------
# This computational engine evaluates the structured scalar vacuum energy
equation
# using deterministic symbolic field inputs derived from a canonical scalar
potential.
#
# It numerically implements:
#
# ρ_sve(x, y, z, t) = (ℏ · ω_v^4)/(2π)^2 · c^3) · ϕ_s(x, y, z, t)
#
# ...where:
# - ϕ_s(x, y, z, t) is a radial kink field with temporal cosine modulation
# - ω_v(x, y, z, t) is a resonance function coupled to local topology
#
# This implementation provides symbolic execution for vacuum coherence
shaping,
# entropy-aware logical systems, and modulated energy density in non-
stochastic form.
# --------------------------------------------------------------------------------
# --------------------------------------------------------------------------------
# CORE SYSTEM FUNCTIONS
# --------------------------------------------------------------------------------
# · phi_s(x, y, z, t) – Radial kink x temporal cosine field modulation ϕ_s
# · omega_v(x, y, z, t) – Topology-driven resonance basis ω_v(x, y, z, t)
# · rho_sve(x, y, z, t) – Structured vacuum energy model from scalar PDE
# · plot_scalar_field(...) – 3D surface visualizer for ϕ_s and ρ_sve cross-sections
#
# All outputs are computed in SI units [J/m^3] and suitable for symbolic
system export.
# --------------------------------------------------------------------------------
# --------------------------------------------------------------------------------
# SYMBOLIC EXECUTION FLOW — ARCHITECTURE OVERVIEW
# --------------------------------------------------------------------------------
#
┌──────────────────────────────────────────────────────────────────────────────┐
# |   Canonical Scalar Vacuum Modulation - Symbolic Flow Structure          |
# |
┌──────────────────────────────────────────────────────────────────────────────┐ |
# | | Step 1: Initialize 4D coordinate mesh (x, y, z, t)              | |
# | | Step 2: Evaluate field ϕ_s(x, y, z, t) from radial potential V(ϕ_s)     | |
# | | Step 3: Compute topological resonance ω_v(x, y, z, t)               | |
# | | Step 4: Evaluate ρ_sve(x, y, z, t) from deterministic scalar model      | |
# | | Step 5: Visualize or export symbolic field topology + energy trace      | |
# |
└──────────────────────────────────────────────────────────────────────────────┘ |
#
└──────────────────────────────────────────────────────────────────────────────┘
# --------------------------------------------------------------------------------
import numpy as np
import matplotlib.pyplot as plt
from mpl_toolkits.mplot3d import Axes3D
# --------------------------------------------------------------------------------
# CONSTANTS (SI Units)
# --------------------------------------------------------------------------------
H_BAR = 1.0545718e-34 # Reduced Planck constant (J·s)
C = 299_792_458       # Speed of light in vacuum (m/s)
LAMBDA = 1.0       # Scalar potential coupling strength
V0 = 1.0             # Vacuum expectation value
# --------------------------------------------------------------------------------
# CORE SYSTEM FUNCTIONS — PATENT CLAIM IMPLEMENTATION
# --------------------------------------------------------------------------------
# Canonical scalar modulation field ϕ_s
def phi_s(x, y, z, t):
    r = np.sqrt(x**2 + y**2 + z**2)
    return V0 * np.tanh(r) * np.cos(2 * np.pi * t)
# Tension-coupled modulation function f(ϕ_s)
def tension_modulation(phi):
    return 1.0 + 0.5 * np.sin(phi)
# Generalized Equation (Claim 2): ∂μ(f(ϕ_s)∂μϕ_s) ≈ ∇·(f(ϕ_s)∇ϕ_s) in spatial
domain only
def generalized_modulation_phi(phi, dx):
    f_phi = tension_modulation(phi)
    grad_x = np.gradient(phi, dx, axis=0)
    grad_y = np.gradient(phi, dx, axis=1)
    fx_grad_x = f_phi * grad_x
```

-continued

Program 1:

```
        fy_grad_y = f_phi * grad_y
        div_x = np.gradient(fx_grad_x, dx, axis=0)
        div_y = np.gradient(fy_grad_y, dx, axis=1)
        return div_x + div_y # Approximation of spatial component
    # Structured vacuum energy density
    def rho_sve(x, y, z, t):
        phi = phi_s(x, y, z, t)
        wv = omega_v(x, y, z, t)
        coefficient = H_BAR / ((2 * np.pi)**2 * C**3)
        return coefficient * (wv ** 4) * phi
    # Scalar potential function
    def potential_v(phi):
        return (LAMBDA / 4.0) * (phi**2 − V0**2)**2
    # Coherence signature detection via symbolic entropy trace
    def coherence_signature_map(field):
        dx = np.gradient(field, axis=0)
        dy = np.gradient(field, axis=1)
        return dx**2 + dy**2
    # Vacuum-resonant frequency ωv shaped by topology
    def omega_v(x, y, z, t):
        r = np.sqrt(x**2 + y**2 + z**2)
        return 1e15 * (1 + 0.1 * np.sin(t)) * np.tanh(r + 1e−3)
    # ------------------------------------------------------------------------------
    # VISUALIZATION MODULE
    # ------------------------------------------------------------------------------
    def plot_scalar_field(X, Y, Z, title, zlabel):
        fig = plt.figure(figsize=(10, 6))
        ax = fig.add_subplot(111, projection='3d')
        ax.plot_surface(X, Y, Z, cmap='viridis', edgecolor='none')
        ax.set_title(title)
        ax.set_xlabel('x [m]')
        ax.set_ylabel('y [m]')
        ax.set_zlabel(zlabel)
        plt.tight_layout( )
        plt.show( )
    # ------------------------------------------------------------------------------
    # EXECUTION BLOCK — Canonical Scalar SVE Snapshot (z = 0, t = 0)
    # ------------------------------------------------------------------------------
    if __name__ == "__main__":
        grid = np.linspace(−2, 2, 200)
        dx = grid[1] − grid[0]
        X, Y = np.meshgrid(grid, grid)
        Z = np.zeros_like(X)
        T = np.zeros_like(X)
        PHI = phi_s(X, Y, Z, T)
        RHO = rho_sve(X, Y, Z, T)
        SIGMA = coherence_signature_map(PHI)
        POTENTIAL = potential_v(PHI)
        GENERALIZED_TERM = generalized_modulation_phi(PHI, dx)
        print(f"Sample φs at (0,0,0,0): {PHI[100,100]:.3e}")
        print(f"Sample ρsve at (0,0,0,0): {RHO[100,100]:.3e} J/m3")
        print(f"Sample coherence variance σ2 at (0,0): {SIGMA[100,100]:.3e}")
          print (f"Sample ∂μ(f(φs)∂μφs) at (0,0):
{GENERALIZED_TERM[100,100]:.3e}")
          plot_scalar_field(X, Y, PHI, "Canonical Scalar Field φs(x, y, z=0, t=0)", "φs")
          plot_scalar_field(X, Y, RHO, "Structured Vacuum Energy Density ρsve", "ρsve
[J/m3]")
          plot_scalar_field(X, Y, POTENTIAL, "Scalar Potential Energy V(φs)", "V(φs)
[J/m3]")
          plot_scalar_field(X, Y, SIGMA, "Coherence Signature Trace σ_entropy2",
"σ2 [unitless]")
          plot_scalar_field(X, Y, GENERALIZED_TERM, "Generalized Modulation
∂μ(f∂μφs)", "∇·(f∇φs)")
```

NUMBERED EXAMPLES

Example 1. A method for modulation of a vacuum energy field, said method comprising: identifying a vacuum energy field, wherein the vacuum energy field includes vacuum energy within a boundary; determining, using a vacuum modulation engine, a scalar field based on the vacuum energy field; calculating, using the vacuum modulation engine, a d'Alembertian operation of the scalar field; calculating, using the vacuum modulation engine, a scalar potential of the scalar field, wherein the d'Alembertian operation of the scalar field is equal to the scalar potential of the scalar field; determining, based on the scalar field and the scalar potential of the scalar field, a modulation field in a format that is configured to be applied by a modulation device; and applying, using the modulation device, the modulation field to the vacuum energy field to structure the vacuum energy field and generate a modulated vacuum energy output.

Example 2. A method in accordance with example 1, wherein the modulation field is applied for adaptive tension modulation, and wherein the modulation field satisfies the following equation: ∂μ(f(ϕs)∂μϕs)=ρs(xα).

Example 3. A method in accordance with example 1, wherein the modulation field is represented by one of a symbolic, tensorial, logical, topological, or algorithmic representation.

Example 4. A method in accordance with example 1, further comprising selecting the modulation field to cause entropy suppression, coherence retention, and symbolic propagation when the modulation field is applied to the vacuum energy field.

Example 5. A method in accordance with example 1, wherein the vacuum modulation engine is implemented in at least one of a hardware, firmware, or symbolic platform.

Example 6. A method in accordance with example 1, further comprising calculating a mathematical transformation of the scalar field, wherein the mathematical transformation includes at least one of a mathematical operation, isomorphisms, domain substitutions, nonlinear embeddings, or variational parameterizations.

Example 7. A method in accordance with example 1, further comprising determining modulation of the vacuum energy field after applying the modulation field to the vacuum energy field.

Example 8. A method in accordance with example 7, wherein the modulation of the vacuum energy field is determined using an entropy trace analysis, coherence spectral signatures, symbolic propagation variance, or energy fluctuation profiles based on the scalar field.

Example 9. A method in accordance with example 1, further comprising calculating a structured vacuum energy density of the modulated vacuum energy output by multiplying a reduced Planck constant and a resonant frequency and dividing a product of the reduced Planck constant and the resonant frequency by a product of a speed of light to a third power and a square of 2.

Example 10. A system for modulation of vacuum energy fields, said system comprising: a vacuum modulation engine configured to: identify a vacuum energy field, wherein the vacuum energy field includes vacuum energy within a boundary; determine a scalar field based on the vacuum energy field; calculate a d'Alembertian operation of the scalar field; calculate a scalar potential of the scalar field, wherein the d'Alembertian operation of the scalar field is equal to the scalar potential of the scalar field; and a modulation device connected to the vacuum modulation engine and configured to apply a modulation field determined based on the scalar field and the scalar potential of the scalar field to the vacuum energy field to structure the vacuum energy field and generate a modulated vacuum energy output.

Example 11. A system in accordance with example 10, wherein the modulation device is configured to apply the modulation field for adaptive tension modulation, and wherein the modulation field satisfies the following equation: ∂μ(f(ϕs)∂μϕs)=ρs(xα).

Example 12. A system in accordance with example 10, wherein the vacuum modulation engine is configured to select the modulation field to cause entropy suppression, coherence retention, and symbolic propagation when the modulation field is applied to the vacuum energy field.

Example 13. A system in accordance with example 10, wherein the vacuum modulation engine is implemented in at least one of a hardware, firmware, or symbolic platform.

Example 14. A system in accordance with example 10, wherein the vacuum modulation engine is configured to calculate a mathematical transformation of the scalar field, wherein the mathematical transformation includes at least one of a mathematical operation, isomorphisms, domain substitutions, nonlinear embeddings, or variational parameterizations.

Example 15. A system in accordance with example 10, wherein the vacuum modulation engine is configured to determine modulation of the vacuum energy field the modulation field is applied to the vacuum energy field.

Example 16. A system in accordance with example 15, wherein the vacuum modulation engine is configured to determine the modulation of the vacuum energy field is determined using an entropy trace analysis, coherence spectral signatures, symbolic propagation variance, or energy fluctuation profiles based on the scalar field.

Example 17. A system in accordance with example 15, wherein the vacuum modulation engine is configured to calculate a structured vacuum energy density of the modulated vacuum energy output by multiplying a reduced Planck constant and a resonant frequency and dividing a product of the reduced Planck constant and the resonant frequency by a product of a speed of light to a third power and a square of 2.

Example 18. At least one non-transitory computer-readable media having computer-executable instructions embodied thereon, wherein executed by a structured vacuum energy system including a vacuum modulation engine connected to a modulation device and having at least one processor in communication with at least one memory device, the computer-executable instructions cause the at least one processor to: identify a vacuum energy field, wherein the vacuum energy field includes vacuum energy within a boundary; determine a scalar field based on the vacuum energy field; calculate a d'Alembertian operation of the scalar field; calculate a scalar potential of the scalar field, wherein the d'Alembertian operation of the scalar field is equal to the scalar potential of the scalar field; determine a modulation field determined based on the scalar field and the scalar potential of the scalar field, wherein the modulation field is in a format that is configured to be applied by a modulation device; and cause a modulation device to apply the modulation field to the vacuum energy field to structure the vacuum energy field and generate a modulated vacuum energy output.

Example 19. At least one non-transitory computer-readable media in accordance with example 18, wherein the modulation field is applied for adaptive tension modulation, and wherein the modulation field satisfies the following equation: ∂μ(f(ϕs)∂μϕs)=ρs(x).

Example 20. At least one non-transitory computer-readable media in accordance with example 18, wherein the instructions cause the modulation device to employ the modulation field to cause entropy suppression, coherence retention, and symbolic propagation when the modulation field is applied to the vacuum energy field.

The described systems and methods provide technical advantages and improve the technology of systems. For example, systems and methods are described which improve performance of computing systems using structured vacuum energy fields. For example, the described systems and methods include a vacuum modulation engine that delivers modulation fields to vacuum energy fields and generates structures within the vacuum energy fields. The described systems and methods are compatible with a broad range of computing architectures including superconducting bit platforms, processing units, and other computing platforms. For example, the described systems and methods increase the capacity of computing systems by providing more efficient operation and enhanced capabilities of the processors. The described systems and methods have advantages for platforms beyond just the scope of computing systems and can be implemented in any suitable environment including elements with vacuum energy fields.

As will be appreciated based on the foregoing specification, the above-described embodiments of the disclosure may be implemented using computer programming or engineering techniques including computer software, firmware, hardware or any combination or subset thereof, wherein the technical effect is to provide enhanced computing. Any such resulting program, having computer-readable code means, may be embodied or provided within one or more computer-readable media, thereby making a computer program product, (i.e., an article of manufacture), according to the discussed embodiments of the disclosure. As used herein, the terms "computer-readable media" or "non-transitory computer-readable media" is intended to be representative of any tangible computer-based device implemented in any method of technology for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. Moreover, as used herein, the terms "computer-readable media" or "non-transitory computer-readable media" includes all tangible, computer-readable media, including, without limitation, non-transitory computer storage devices, including without limitation, volatile and non-volatile media, and removable and non-removable media such as firmware, physical and virtual storage, CD-ROMS, DVDs, and any other digital source such as a network or the Internet, as well as yet to be developed digital means, with the sole exception being transitory, propagating signal.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

When introducing elements of the present disclosure, the articles "a", "an", "the" and "the" are intended to mean that there are one or more of the elements. The terms "comprising", "including" and "having" are intended to be inclusive and mean that there may be additional elements other than the listed elements. Moreover, the use of "top", "bottom", "above", "below" and variations of these terms is made for convenience, and does not require any particular orientation of the components.

As various changes could be made in the above without departing from the scope of the disclosure, it is intended that all matter contained in the above description and shown in the accompanying drawings shall be interpreted as illustrative and not in a limiting sense.

What is claimed is:

1. A system for non-stochastic modulation and performance enhancement of a computing system using vacuum energy fields, said system comprising:

a vacuum modulation engine including at least one processor and a memory including computer-executable instructions that cause the at least one processor to:

identify a vacuum energy field, wherein the vacuum energy field includes vacuum energy within a boundary associated with the computing system;

determine a scalar field based on the vacuum energy field;

calculate a d'Alembertian operation of the scalar field;

calculate a scalar potential of the scalar field based on the d'Alembertian operation of the scalar field, wherein the d'Alembertian operation of the scalar field is equal to the scalar potential of the scalar field; and determine a modulation field based on the scalar field and the scalar potential of the scalar field to structure the vacuum energy field and generate a modulated vacuum energy output; and a modulation device connected to the vacuum modulation engine and incorporated into the computing system, wherein the modulation device is configured to dynamically adjust an execution parameter of the computing system in real-time based on the calculated modulation field to achieve at least one of faster execution speed, reduced power usage, extended stability period for a control loop, increased system resilience to load fluctuations, enhanced information coherence in distributed systems, or increased processing capacity of the computing system.

2. The system in accordance with claim 1, wherein the modulation field is represented by one of a symbolic, tensorial, logical, topological, or algorithmic representation.

3. The system in accordance with claim 1, further comprising selecting the modulation field to cause entropy suppression, coherence retention, and symbolic propagation when the modulation field is applied to the vacuum energy field.

4. The system in accordance with claim 1, wherein the vacuum modulation engine is configured to determine a resonant frequency of the vacuum energy field and calculate a structured vacuum energy density based on the resonant frequency.

5. The system in accordance with claim 1, further comprising calculating a mathematical transformation of the scalar field, wherein the mathematical transformation includes at least one of a mathematical operation, isomorphisms, domain substitutions, nonlinear embeddings, or variational parameterizations.

6. The system in accordance with claim 1, further comprising applying the modulation field to the vacuum energy field and determining modulation of the vacuum energy field after applying the modulation field to the vacuum energy field.

7. The system in accordance with claim 6, wherein the modulation of the vacuum energy field is determined using an entropy trace analysis, coherence spectral signatures, symbolic propagation variance, or energy fluctuation profiles based on the scalar field.

8. The system in accordance with claim 1, further comprising calculating a structured vacuum energy density of the modulated vacuum energy output by multiplying a reduced Planck constant and a resonant frequency and dividing a product of the reduced Planck constant and the resonant frequency by a product of a speed of light to a third power and a square of 2π.

9. The system in accordance with claim 1, wherein the modulation field includes at least one of an electric current, a wave, light, a sound, electromagnetism, or vacuum energy.

* * * * *